United States Patent [19]
Ma

[11] 3,735,501
[45] May 29, 1973

[54] EDUCATIONAL TOY

[76] Inventor: Edmund Ma, 20 Graydon Hall Drive, Apt. 209, Don Mills, Ontario, Canada

[22] Filed: Oct. 12, 1971

[21] Appl. No.: 188,134

[52] U.S. Cl. ................................................35/9 C
[51] Int. Cl. ..............................................G09b 7/10
[58] Field of Search .........................35/9 B, 9 C, 9 D

[56] References Cited

UNITED STATES PATENTS

| | | | |
|---|---|---|---|
| 3,621,590 | 11/1971 | Olynick | 35/9 C |
| 3,106,784 | 10/1963 | Raley | 35/9 C |
| 3,562,922 | 2/1971 | Friedman et al. | 35/9 B |
| 3,067,524 | 12/1962 | Parker | 35/9 D |
| 3,327,405 | 6/1967 | Ingeneri | 35/9 B |
| 3,100,352 | 8/1963 | Boissevain | 35/9 C |

*Primary Examiner*—William H. Grieb
*Attorney*—James T. Wilbur, Arne I. Fors and Frank I. Piper

[57] ABSTRACT

A toy having a housing provided with at least two sets of double-pole electrical terminals on an exterior face. Two signalling lamps are provided and each may be electrically connected to any double-pole electrical terminal. A card imprinted with a different numeral or other indicium is removably mounted to the panel and when so mounted, each different indicium is positioned beside a different double-pole terminal. In one embodiment of the toy, a printed circuit board electrically inter-connects each double-pole terminal in one set with a different terminal in the other set. The lamps are illuminated when they are connected to double-pole terminals electrically inter-connected via the circuit board. In a second embodiment of the toy, the card is provided with teeth along one edge. When the card is mounted to the housing, the teeth serve to open some but not all of a number of switches each of which, in its normally closed position, interconnects pairs of double-pole terminals. The lamps are illuminated when they are connected to terminals electrically inter-connected via switches not opened by the teeth. In both embodiments, the card is matched with the circuit board or the teeth such that the indicia beside electrically inter-connected terminals bear some relationship to one another.

5 Claims, 8 Drawing Figures

PATENTED MAY 29 1973

INVENTOR.
EDMUND MA

BY

Agent

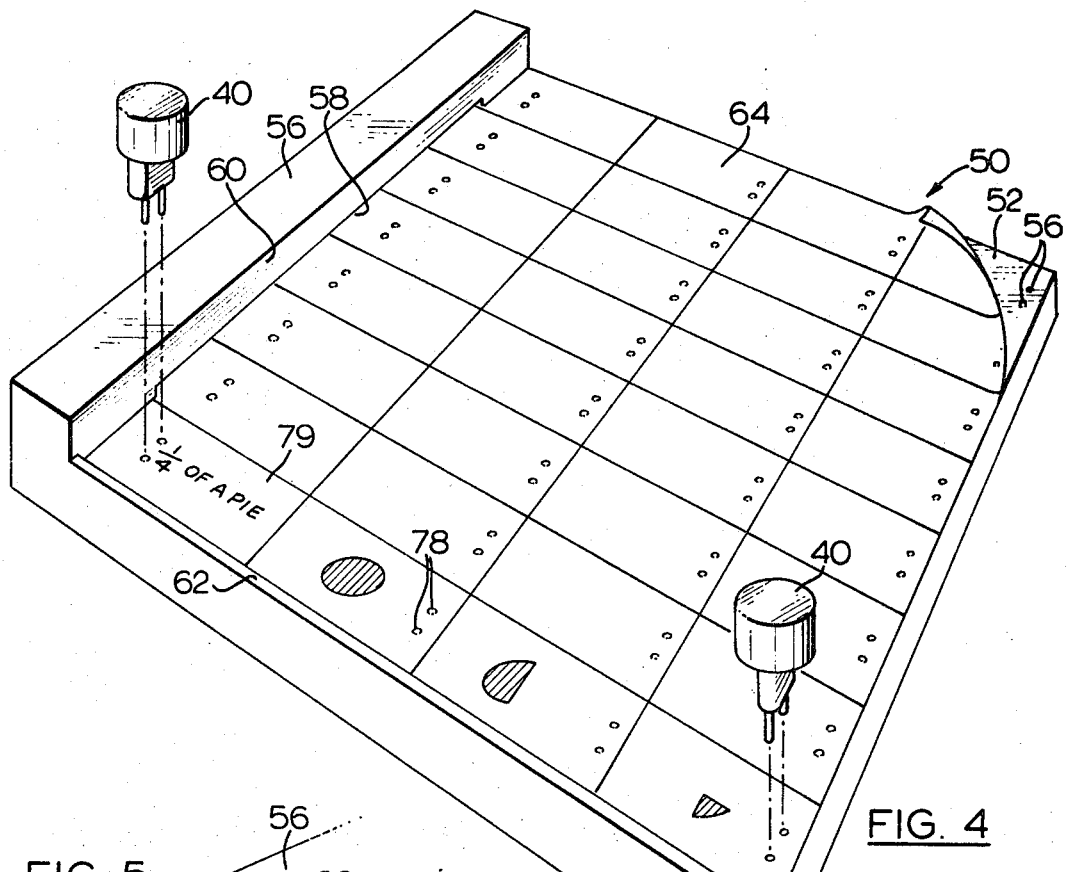
FIG. 4
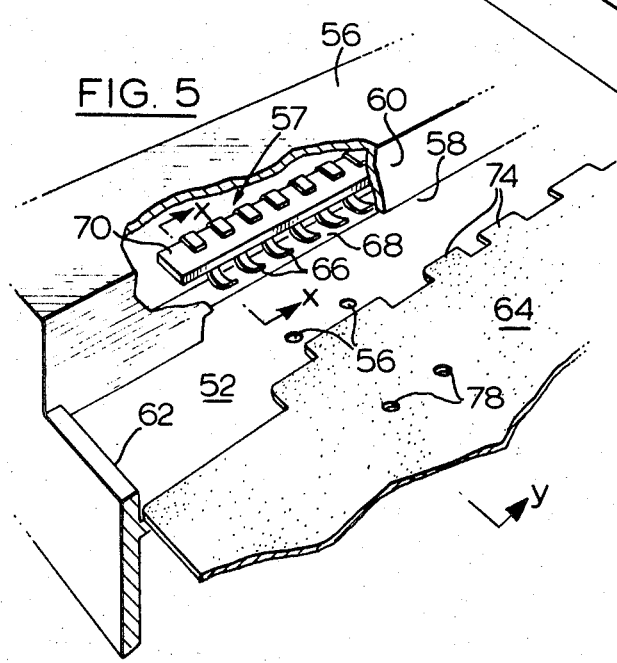
FIG. 5
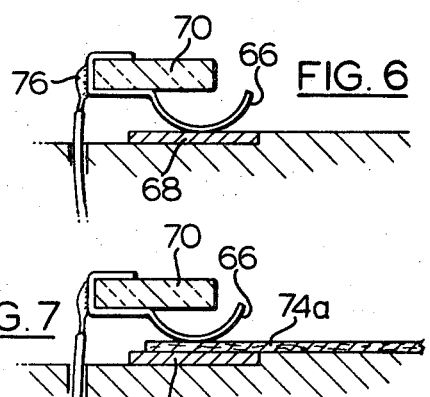
FIG. 6
FIG. 7
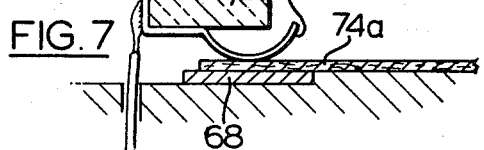
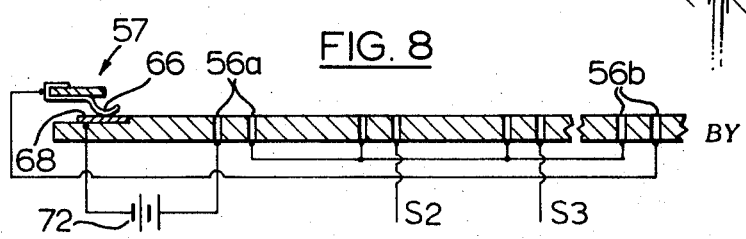
FIG. 8
INVENTOR.
EDMUND MA
Agent

EDUCATIONAL TOY

This invention relates to educational toys and is more particularly directed to a toy which assists children to acquire basic skills in such subjects as arithmetic, reading, shape and color perception and so on.

Multiple-choice testing toys are known in which a series of questions and answers are displayed on an exterior face. When an answer is matched with a question, the devices indicate in some manner whether the match is correct. One such toy for example, consists of a console displaying a relatively small number of questions and answers. The questions and answers are displayed on a flexible sheet which is attached to the console and which may be replaced by other sheets having different questions and answers. The device is operated by pressing a button or alternatively contacting an electrically conducting pointer beside the desired answer. A light or other signalling means is activated if the choice is correct.

A major short-coming of such device is that there is a common pattern of correct responses on every sheet. Once the child learns the pattern, he will score a correct response without regard to the questions and answers on the sheets. The entire purpose of the toy is therefore defeated since a child is induced to learn the pattern and choose the correct answer on that basis rather on the basis of genuinely pondering the question posed and selecting the correct answer on the basis of the question. More complicated devices eliminate this short-coming by incorporation of a printed circuit in each response sheet. The sheet not only presents questions and answers but programs the devices to signal correct answers. Such program sheets are expensive to manufacture and greatly increase the cost and flexibility of the toy.

It is accordingly an object of the present invention to provide a toy of simple construction having inexpensive means by which one program and the question and answer sheet associated therewith may be substituted for another.

Another object is to provide an educational toy in which two indicating means such as electrically operable lamps are energized when disposed in predetermined correct relative positions.

Another object is to provide an educational toy which can be manufactured so as to have considerable appeal to young children and consequently to have considerable value in their education by, for example, helping them to acquire basic skills in subjects such as arithmetic and reading.

These and other objects may be accomplished by an educational toy comprising: a housing having a panel for receipt of a removable indicia carrying card; a plurality of sets of double-pole electrical terminals disposed on the panel of said housing; a plurality of sets of contact points, the contact points of each said set being in circuit with a different said pole of each said set of electrical terminals; selector means adapted to engage said contact points whereby contact points of one said set are electrically connected to selective contact points of another said set; power supply means in circuit with said selectively inter-connected contact points; a pair of manually operable instruments each adapted to be detachably connected to and thereby electrically inter-connect the poles of each said electrical terminal; and signalling means in circuit with and activated by said power supply means when both said instruments complete a circuit with electrically inter-connected contact points.

Preferred embodiments of the invention will now be described with reference to the accompanying drawings in which:

FIG. 4 is a perspective view of a second embodiment of the educational toy of the invention;

FIG. 5 is a partial perspective view, partly cut away, of the educational toy illustrated in FIG. 4;

FIGS. 6 and 7 are sections on line X—X of FIG. 5; and

FIG. 8 is section on line X–Y of FIG. 5.

Like reference characters refer to like parts throughout the description of the drawings.

Figure 1:
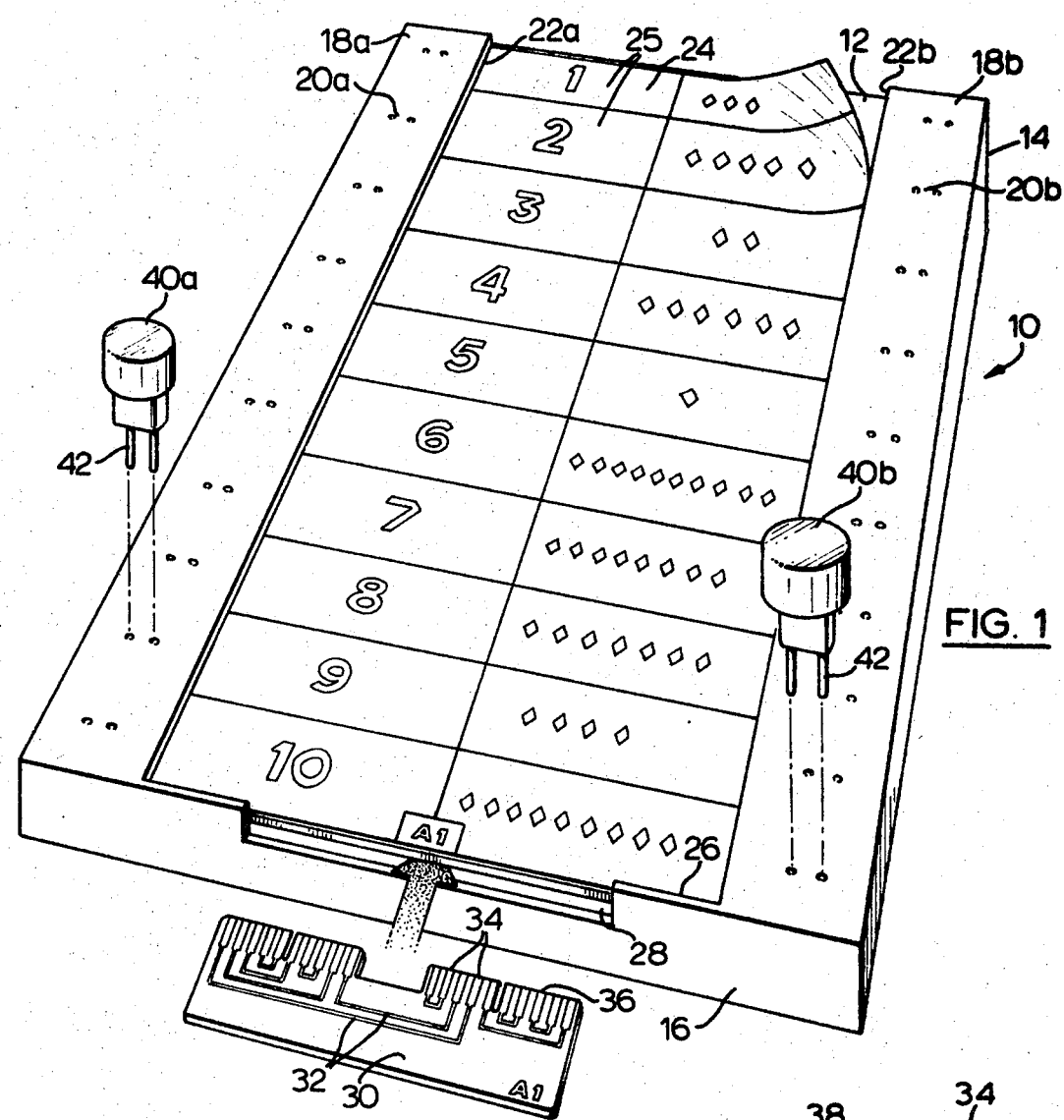
FIG. 1 is a perspective view of one embodiment of the educational toy in accordance with the invention.

With reference to FIG. 1, one embodiment of the educational toy of the invention is illustrated and indicated generally by the numeral 10. The toy is generally in the shape of a rectangular box having a top panel 12 and back and front panels 14 and 16 respectively. The top panel 12 is composed of two raised and elongated lateral faces 18a and 18b. An equal number of double-pole electrical terminals 20a and 20b are disposed along each raised face. Grooves 22a and 22b extend along the inside edge of each face for receipt of the side edges of a flexible removable indicia carrying card 24. A raised stop wall 26 is formed along the front panel 16 for holding the card in place.

Card 24 is divided into two sets of boxed-in areas 25 each imprinted with a different numeral or other indicium. When the card is attached to the top panel as illustrated, a double-pole electrical terminal 20 is disposed beside each boxed area 25.

An elongated aperture 28 is formed in front panel 16 for receipt of a printed circuit selector board 30 the material of which being composed of plastic or any other suitable nonconducting material. A number of electrically conductive strips 32 are plated upon the base material and each strip terminates at terminal 34 arranged along edge 36 of the selector board. When the selector board is inserted in aperture 28, each terminal 34 electrically contacts a different contact point 38 within the toy. These contact points are illustrated schematically in FIG. 2.

The educational toy is provided with a pair of manually operable signalling instruments 40a and 40b. Each signalling instrument is provided with a pair of spaced apart prongs 42 for removable insertion into any double-pole electrical terminal 20. An electric light bulb is fitted into each instrument and is connected in series with the prongs.

Figure 2:
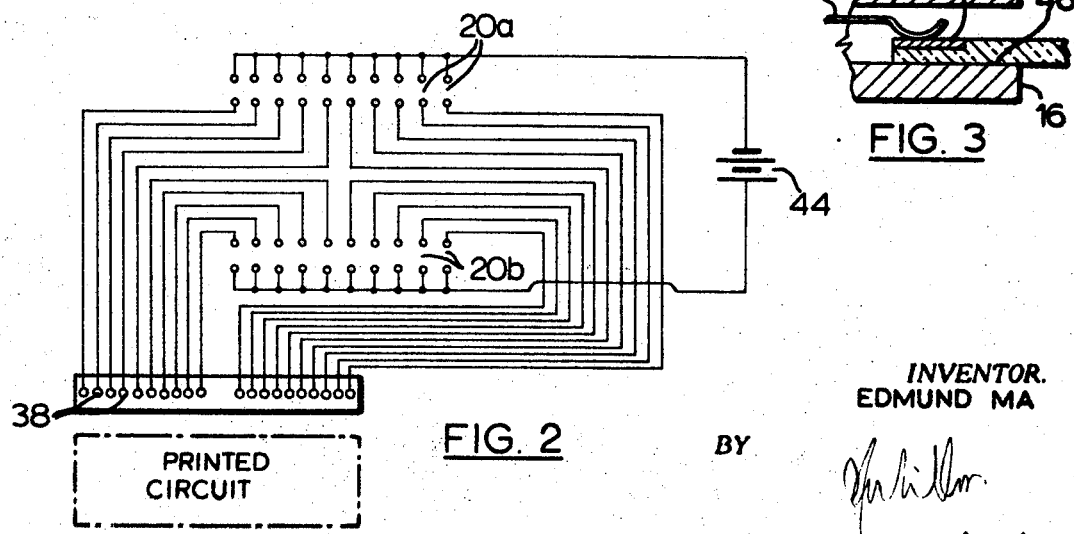
FIG. 2 is an electrical circuit diagram showing the electrical inter-connections provided within the housing of the toy shown in FIG. 1.

With reference to FIG. 2, each pole of electrical terminals 20a is electrically connected to one side of a power supply 44 and one pole of each electrical terminal 20b is connected to the other side of the power supply. Each of the remaining poles are electrically connected to a different contact point 38 mounted within the toy.

Figure 3:
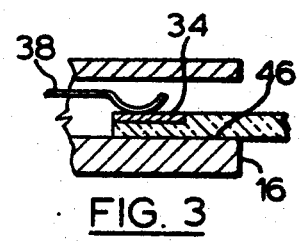
FIG. 3 is a partial side view of an electrical connection within the housing of FIG. 1.

FIG. 3 illustrates the manner in which contact is made between each contact point 38 and terminal 34 of the printed circuit selector board 30. When the selector board is within aperture 28, the board rests on surface 46. Each contact point 38 is composed of a leaf spring which bears resiliently downwardly against terminal 34 of the printed circuit board. Contact point 38 serves not only to make electrical connection with terminals 34 but also serves to releasably clamp the selector board to the toy.

When the terminals 34 of the printed circuit board engage contact points 38, the electrically conductive strips 32 of the selector board electrically connect each pole of electrical terminals 20a to a selective pole of electrical terminals 20b. When the two signalling instruments 40 are inserted in electrical terminals having inter-connected poles, a circuit is completed and the light bulbs in the instruments are illuminated. Only where the instruments are inserted into terminals having poles electrically connected via board 30 will the lights be illuminated.

The educational toy illustrated in FIGS. 1 to 3 is operated very simply as follows: the operator attempts to match indicia within two boxed areas 25 having a visual, numeral or other relationship to one another. The indicia must be found on opposite sides of the card thus a match for the numeral 10 on the left side of card 24 must be found within a boxed-in area in the right side of the card. The match is registered by placing instruments 40 into the electrical terminals beside matching indicia. Provided the match is correct, the light bulbs within the instruments 40 will both be illuminated.

To enable correct matches to be signalled, it is necessary of course, that the strips on the selector board 30 electrically inter-connect poles beside matching indicia. By means of the removable selector board 30, the toy can be programmed to indicate any two terminals in opposite faces as matched sets. Cards having different arrangements of matching indicia may therefore be freely substituted for the illustrated card 24. The toy will indicate correctly matched pairs of indicia provided the selector board attached to the device has an arrangement of conductor strips which connect poles of matching pairs.

With reference to FIG. 4, another embodiment of the educational toy of the invention is illustrated and indicated generally 50. The toy has a top panel 52 along which four sets of double-pole electrical terminals 56 are disposed in parallel. A raised face 60 extends along one side of the toy and is disposed parallel to the sets of terminals 56. An elongated groove 58 is formed along the inside wall 60 of the raised face. A raised stop 62 extends along one end of the top panel and serves to retain the indicia carrying card 64 in place.

With reference to FIG. 5, mounted beneath raised face 56 is a series of normally closed switches indicated generally 57. Each switch is composed of a leaf spring contact point 66 and a contact strip 68. The leaf springs 66 are anchored to an insulating member 70 and the lower ends are biased against contact strip 68. Strip 68 extends along the length of the top panel and is connected to one side of a power supply 72 (FIG. 8).

A plurality of selector teeth 74 are cut into the side edge of card 64. When the card is attached to the top panel 52 in the manner illustrated in FIG. 4, teeth 74 are contained within groove 58 and are between preselected leaf springs 66 and strip 68.

FIG. 6 illustrates a switch in a normally closed position where leaf spring 66 touches strip 68. An insulated wire 76 is connected to each leaf spring 66. When card 64 is fastened to the top panel, teeth 74 are moved laterally into groove 58 and, depending on the shape of teeth 74, selected switches will be opened in the manner illustrated in FIG. 7 wherein leaf spring 66 is caused to move upwardly against its bias when tooth 74a is slid into groove 58 whereby contact of the leaf spring with strip 74 is broken.

With reference again to FIG. 4, card 64 is divided into four columns. The first column on the left is a "question" column and the three remaining columns are "answer" columns. Beside each question and answer are two perforations 78 and these perforations are in registry with double-pole electrical terminals 56 mounted in the top panel. A typical "question" is contained in the lowermost boxed area 79 of the question column and three possible "answers" are set out in the same row. Matching of the question with an answer is accomplished by insertion of the prongs of one signalling member 40 through the perforations beside the question and the prongs of the other signalling member through the perforations beside an answer in the same row. When the prongs enter the double-pole electrical terminals 56 beneath the perforations, the light bulbs of both members 40 will be illuminated provided there is a correct match.

FIG. 8 illustrates the wiring arrangement which accomplishes this result. Leaf spring 66 of the switch is connected to one pole of an "answer" electrical terminal 56b and the other pole of the same electrical terminal is connected to one pole of a "question" electrical terminal 56a. The other pole of terminal 56a is connected to one side of power supply 72 and the other side of the power supply is connected to strip 68. For each row of question and answers, three switches 57 are required and wires marked S2 and S3 are joined to the leaf contacts of the other two switches. Strip 68 against which these leaf contacts abut is of course connected to power supply 72.

When switch 57 is in the position shown in FIG. 8, insertion of the prongs of one signalling member 40 into terminal 56a and the prongs of the other signalling member into terminal 56b will complete a circuit through power supply 72 and the bulbs of members 40 will be illuminated. When however, a tooth 74a is between leaf spring 66 and strip 68 in the manner illustrated in FIG. 7, the bulbs will not be illuminated.

Teeth 74 are so arranged that they always cause two switches 57 connected to "answer" terminals in each row to open. One switch in each row, namely the "correct" answer switch, remains closed when the card 64 is in position. The switch which remains open will of course depend upon the shape of the tooth. The toy can therefore be programmed to register correctly matched questions and answers in each row no matter which answer is correct. Programming is achieved by correct shaping of the teeth.

It will be understood that modifications can be made in the preferred embodiments of the invention described and illustrated herein without departing from the scope and purview of the invention as defined by the appended claims. For example, it is unnecessary that light bulbs be incorporated in both signalling members 40 or even that correct matches be indicated by lights. A correct match may for example, be indicated by a light bulb or bell mounted to the toy console and connected in series with the power supply. In such case the light bulbs within members 40 may be removed and replaced by conductive wire which electrically interconnects the prongs of each member.

Other means for signalling a correct match will be readily apparent to skilled workmen and such means are intended to be within the scope of the invention.

What I claim as new and desire to protect by Letters Patent of the United States is:

1. An educational toy comprising: a housing having a panel for receipt of a removable indicia carrying card; at least three sets of double-pole electrical terminals disposed on the panel of said housing; a plurality of sets of contact points, the contact points of each said set being in circuit with a different said pole of each said set of electrical terminals; and each said pole in two said sets being in circuit with a different said contact point in two said sets, each contact point in said two sets, together with each contact point in circuit with said third set of electrical terminals defining a normally closed switch; selector means adapted to engage said contact points to cause opening of selective said switches; power supply means in circuit with closed switches; a pair of manually operable instruments each adapted to be detachably connected to and thereby electrically inter-connect the poles of each said electrical terminal; and signalling means in circuit with and activated by said power supply means when both said instruments complete a circuit with closed switches.

2. The educational toy as claimed in claim 1 wherein said cards are removably supported on said housing in holders provided thereon.

3. The educational toy as claimed in claim 1 wherein said signalling means is an electrical light bulb incorporated in said instrument.

4. An educational toy comprising: a housing having a panel for receipt of a removable indicia carrying card; at least three sets of double-pole electrical terminals disposed on the panel of said housing; a plurality of sets of switches, the number of switches in each said set being one less than the number of sets of electrical terminals, each said switch having a pair of contacts and being normally closed, one contact of each said pair being in circuit with a different said pole of one said set of electrical terminals, one said pole in each remaining set of electrical terminals being electrically connected to the other contact of a different said switch in each set; selector means adapted to open every switch but one in each said set; power supply means in circuit with the one closed switch in each said set; a pair of manually operable instruments each detachably connectable to and electrically inter-connecting the poles of each said electrical terminals; and signalling means in circuit with and activated by said power supply means when both said instruments complete a circuit with said one closed switch in every set.

5. The educational toy as claimed in claim 4 further including at least one said indicia carrying card, said card having teeth cut therein which define said selector means.

* * * * *